US008810689B2

(12) United States Patent  
Ozawa et al.

(10) Patent No.: US 8,810,689 B2  
(45) Date of Patent: Aug. 19, 2014

(54) IMAGE PROCESSING APPARATUS, IMAGING APPARATUS, IMAGE PROCESSING METHOD, AND PROGRAM FOR PROCESSING IMAGE DATA AT A PLURALITY OF FRAME RATES

(75) Inventors: Hitoshi Ozawa, Kanagawa (JP); Yasushi Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 564 days.

(21) Appl. No.: 12/191,410

(22) Filed: Aug. 14, 2008

(65) Prior Publication Data

US 2009/0046175 A1 Feb. 19, 2009

(30) Foreign Application Priority Data

Aug. 17, 2007 (JP) ................ P2007-213017

(51) Int. Cl.  
  *H04N 5/76* (2006.01)

(52) U.S. Cl.  
  USPC ............. 348/231.6; 348/231.3; 348/231.99

(58) Field of Classification Search  
  CPC . H04N 5/232; H04N 5/772; H04N 19/00036; H04N 19/00151; H04N 19/00206; H04N 19/00272; H04N 19/00278; H04N 19/00533; H04N 19/00721; H04N 19/00781; H04N 19/00884; H04N 19/00939; H04N 7/0112; H04N 19/00127; H04N 19/00472; H04N 5/781; H04N 7/01; G01C 21/3647; G09G 2340/02; G09G 2340/0435; G09G 2310/04; G09G 2320/0261; G11B 27/3027  
  USPC ................ 348/231.1–231.99; 12/231.3  
See application file for complete search history.

(56) References Cited

U.S. PATENT DOCUMENTS

| | | | | |
|---|---|---|---|---|
| 6,469,744 B1 * | 10/2002 | Pearlstein | ............. | 348/554 |
| 6,828,967 B1 * | 12/2004 | King et al. | ............. | 345/428 |
| 7,242,850 B2 * | 7/2007 | Cok | ............. | 386/241 |
| 7,305,135 B2 * | 12/2007 | Honda et al. | ............. | 382/236 |
| 7,750,973 B2 * | 7/2010 | Nakase et al. | ............. | 348/441 |
| 8,064,752 B1 * | 11/2011 | Black | ............. | 386/328 |
| 8,135,261 B1 * | 3/2012 | Black | ............. | 386/284 |
| 2002/0015442 A1 * | 2/2002 | Takeuchi et al. | ............. | 375/211 |
| 2002/0015582 A1 * | 2/2002 | Matsumoto et al. | ............. | 386/111 |
| 2002/0102023 A1 * | 8/2002 | Yamauchi | ............. | 382/199 |
| 2004/0081437 A1 * | 4/2004 | Asada et al. | ............. | 386/131 |
| 2004/0257440 A1 * | 12/2004 | Kondo et al. | ............. | 348/94 |
| 2004/0264931 A1 * | 12/2004 | Nakashika et al. | | |
| 2004/0267954 A1 * | 12/2004 | Shen | ............. | 709/231 |
| 2005/0018049 A1 * | 1/2005 | Falk | ............. | 348/207.99 |
| 2005/0102704 A1 * | 5/2005 | Prokupets et al. | ............. | 725/118 |

(Continued)

FOREIGN PATENT DOCUMENTS

| | | |
|---|---|---|
| JP | 2002 320203 | 10/2002 |
| JP | 2004 180289 | 6/2004 |

(Continued)

*Primary Examiner* — Chia-Wei A Chen  
(74) *Attorney, Agent, or Firm* — Frommer Lawrence & Haug LLP; William S. Frommer

(57) ABSTRACT

An image processing apparatus for performing recording and playing image data at a plurality of frame rates. The image processing apparatus includes a storage section, and a control section configured to, when performing the process of recording the image data at each of the frame rates, set information concerning a recording rate corresponding to the frame rate in a data area, in accordance with a predetermined file format, that is paired with stream data to be recorded, and store the information in the storage section.

20 Claims, 18 Drawing Sheets

(56) References Cited

U.S. PATENT DOCUMENTS

| | | | |
|---|---|---|---|
| 2005/0141620 A1* | 6/2005 | Hattori | |
| 2005/0204046 A1* | 9/2005 | Watanabe | 709/228 |
| 2005/0259172 A1* | 11/2005 | Okawa | 348/333.12 |
| 2005/0271358 A1* | 12/2005 | Inata et al. | 386/52 |
| 2006/0100515 A1* | 5/2006 | Nakata | 600/441 |
| 2006/0164519 A1* | 7/2006 | Kaku | 348/222.1 |
| 2006/0238620 A1* | 10/2006 | Asada et al. | 348/207.99 |
| 2006/0256207 A1* | 11/2006 | Kokubo et al. | 348/223.1 |
| 2007/0091204 A1* | 4/2007 | Koshimizu et al. | 348/441 |
| 2007/0179979 A1* | 8/2007 | Folgner et al. | 707/104.1 |
| 2007/0230920 A1* | 10/2007 | Gasper | 386/112 |
| 2008/0007643 A1* | 1/2008 | Okumura | 348/333.01 |
| 2008/0057894 A1* | 3/2008 | Aleksic et al. | 455/187.1 |
| 2008/0072092 A1* | 3/2008 | Hurley | 713/400 |
| 2008/0131086 A1* | 6/2008 | Hutten | 386/109 |
| 2008/0158365 A1* | 7/2008 | Reuter | 348/207.1 |
| 2008/0211941 A1* | 9/2008 | Deever et al. | 348/262 |
| 2008/0232464 A1* | 9/2008 | Tahara et al. | 375/240.02 |
| 2009/0003172 A1* | 1/2009 | Yahata et al. | 369/53.41 |
| 2009/0268808 A1* | 10/2009 | Li et al. | 375/240.02 |
| 2010/0002082 A1* | 1/2010 | Buehler et al. | 348/159 |

FOREIGN PATENT DOCUMENTS

| | | |
|---|---|---|
| JP | 2006 352529 | 12/2006 |
| JP | 2006 352581 | 12/2006 |
| JP | 2007 116418 | 5/2007 |

* cited by examiner

"1" : ON

"0" : OFF

FIG.20

|  |  | PLAYBACK RATE | | | | |
|---|---|---|---|---|---|---|
|  |  | 60FPS | 90FPS | 120FPS | 240FPS | ALL FRAMES PLAYBACK |
| RECORDING RATE | 60FPS | - | - | - | - | - |
|  | 90FPS | 2/3 | - | - | - | - |
|  | 120FPS | 1/2 | 3/4 | - | - | - |
|  | 240FPS | 1/4 | 3/8 | 1/2 | - | - |

FIG.21

|  |  | PLAYBACK RATE | | | | |
|---|---|---|---|---|---|---|
|  |  | 60FPS | 90FPS | 120FPS | 240FPS | ALL FRAMES PLAYBACK |
| RECORDING RATE | 60FPS | 1 | 3/2 | 2 | 4 | 1 |
|  | 90FPS | - | 1 | 4/3 | 8/3 | 1 |
|  | 120FPS | - | - | 1 | 2 | 1 |
|  | 240FPS | - | - | - | 1 | 1 |

FIG.22A
RECORDED IMAGE DATA

FIG.22B

☐ RECORDING RATE = 60FPS  ▨ RECORDING RATE = 120FPS
▨ RECORDING RATE = 90FPS  ▨ RECORDING RATE = 240FPS

FIG. 23A
RECORDED IMAGE DATA

FIG. 23B
READ DATA = DISPLAYED IMAGES

IMAGE PROCESSING APPARATUS, IMAGING APPARATUS, IMAGE PROCESSING METHOD, AND PROGRAM FOR PROCESSING IMAGE DATA AT A PLURALITY OF FRAME RATES

CROSS REFERENCES TO RELATED APPLICATIONS

The present invention contains subject matter related to Japanese Patent Application JP 2007-213017, filed in the Japan Patent Office on Aug. 17, 2007, the entire contents of which being incorporated herein by reference.

BACKGROUND OF THE INVENTION

1. Field of the Invention

The present invention relates to an image processing apparatus, an imaging apparatus, an image processing method, and a program, which allow images to be processed at an arbitrary frame rate among a plurality of frame rates.

2. Description of the Related Art

In existing video recording systems (Motion JPEG, MPEG2/4/H.264 AVC, etc.), a frame rate is fixed at a static value (30 fps, 60 fps, etc.) beforehand.

Accordingly, in common imaging apparatuses, a video is taken at 30 or 60 frames per second.

In this case, a smooth video of an object moving at a high speed may not be recorded, for example.

In order to handle such a situation, apparatuses that are capable of changing the frame rate have been proposed (see Japanese Patent Laid-open No. 2006-352581 and Japanese Patent Laid-open No. 2007-116418, for example).

Japanese Patent Laid-open No. 2006-352581 discloses a method of recording and playing a video that involves a mixture of two frame rates, i.e., a low frame rate and a high frame rate.

Japanese Patent Laid-open No. 2007-116418 discloses a recording apparatus that allows the frame rate to be changed linearly in the case where, while a video is recorded at a low frame rate, such as 60 fps, a recording rate is changed to a high frame rate, such as 240 fps, because of a user operation or the like.

SUMMARY OF THE INVENTION

The technique as disclosed in Japanese Patent Laid-open No. 2006-352581 may be applied even when an apparatus that is capable of recording a video at three or more different frame rates is used, for example. In that case, however, it is necessary to add stream information (a video stream header) on a frame-rate basis, and add a super index, which indicates a section recorded at a high rate, and so on, resulting in the need for complicated recording control.

Meanwhile, according to the technique as disclosed in Japanese Patent Laid-open No. 2007-116418, an extended file format, as compared to a common RIFF AVI file format as illustrated in FIG. 1, has to be applied, and a section recorded at a high rate is recorded as separate stream information.

Accordingly, in the case where a video recorded by this technique is played with common player software used on a personal computer (PC), for example, it may so happen that the section recorded at a high rate cannot be played, while low frame rate playback is possible.

The present invention addresses the above-identified, and other problems associated with methods and apparatuses in related art, and provides an image processing apparatus, an imaging apparatus, an image processing method, and a program, which are capable of allowing a video recorded at two or more different frame rates to be played at a desired playback rate, with simple control and without disturbing a predetermined file format.

According to one embodiment of the present invention, there is provided an image processing apparatus capable of performing processes of recording and playing image data at a plurality of frame rates, the apparatus including a storage section, and a control section configured to, when performing the process of recording the image data at each of the frame rates, set information concerning a recording rate corresponding to the frame rate in a data area, in accordance with a predetermined file format, that is paired with stream data to be recorded, and store the information in the storage section.

According to another embodiment of the present invention, there is provided an imaging apparatus including: an imaging section configured to take an image of a subject and output image data thereof; and an image processing apparatus configured to perform a predetermined process on the image data. The image processing apparatus includes a storage section, and a control section configured to, when performing a process of recording the image data at each of frame rates, set information concerning a recording rate corresponding to the frame rate in a data area, in accordance with a predetermined file format, that is paired with stream data to be recorded, and store the information in the storage section.

According to yet another embodiment of the present invention, there is provided an image processing method of performing processes of recording and playing image data at a plurality of frame rates, the method including the steps of: when performing the process of recording the image data at each of the frame rates, setting information concerning a recording rate corresponding to the frame rate in a data area, in accordance with a predetermined file format, that is paired with stream data to be recorded, and storing the information in a storage section; and when performing the process of playing the recorded image data, reading the information concerning the recording rate stored in the storage section to perform the playing process.

According to yet another embodiment of the present invention, there is provided a program that causes a computer to perform image processing of performing processes of recording and playing image data at a plurality of frame rates, the image processing including: a process of, when performing the process of recording the image data at each of the frame rates, setting information concerning a recording rate corresponding to the frame rate in a data area, in accordance with a predetermined file format, that is paired with stream data to be recorded, and storing the information in a storage section; and a process of, when performing the process of playing the recorded image data, reading the information concerning the recording rate stored in the storage section to perform the playing process.

According to the present invention, when the process of recording the image data is performed at each frame rate, the information concerning the recording rate corresponding to the frame rate is set in the data area, in accordance with the predetermined file format, that is paired with the stream data to be recorded, and stored in the storage section.

Then, when the process of playing the recorded image data is performed, the information concerning the recording rate stored in the storage section is read to perform the playing process.

According to the present invention, it is possible to allow a video recorded at two or more different frame rates to be played at a desired playback rate, with simple control and without disturbing a predetermined file format.

BRIEF DESCRIPTION OF THE DRAWINGS

FIG. 20 shows an exemplary definition table of read intervals of index entries according to the present embodiment;
FIG. 21 shows an exemplary table showing the number of times images recorded at particular recording rates should be displayed repeatedly, when played at particular playback rates, according to the present embodiment;
FIGS. 22A and 22B illustrate an exemplary case where images recorded at 60 fps, 90 fps, 120 fps, and 240 fps are displayed in a normal manner at 60 fps (i.e., selectively eliminated in reading);
and
FIGS. 23A and 23B illustrate an exemplary case where images recorded at 60 fps, 90 fps, 120 fps, and 240 fps are played at a reduced speed, approximately at 240 fps (i.e., with increased numbers of display instances).

DETAILED DESCRIPTION OF THE PREFERRED EMBODIMENT

Hereinafter, an embodiment of the present invention will be described with reference to the accompanying drawings.

Figure 2:
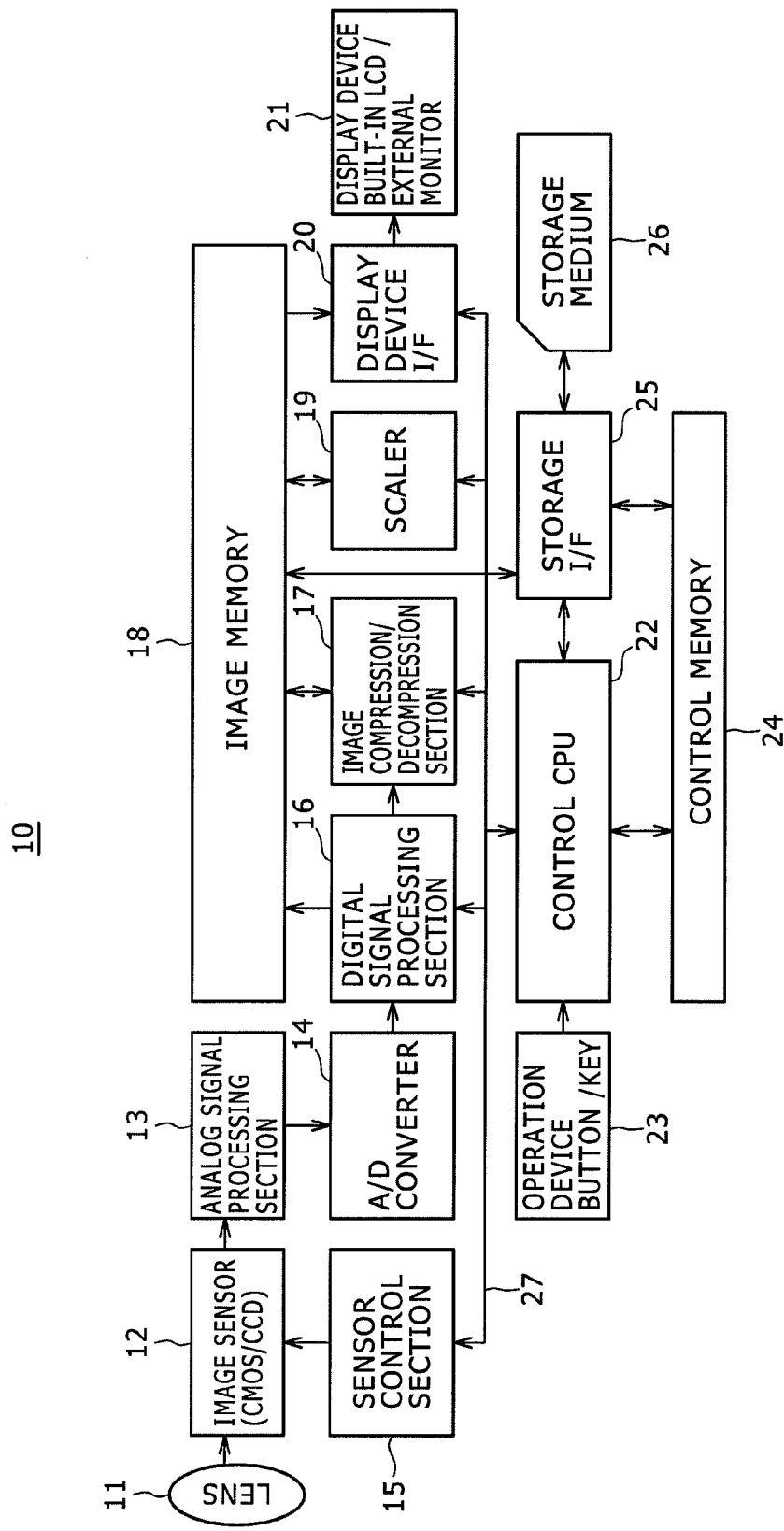
FIG. 2 is a block diagram illustrating an exemplary structure of a camera system (an imaging apparatus) that adopts an image processing apparatus according to one embodiment of the present invention.

FIG. 2 is a block diagram illustrating an exemplary structure of a camera system (an imaging apparatus) 10 that adopts an image processing apparatus according to one embodiment of the present invention.

The image processing apparatus according to the present embodiment is configured to be capable of recording a video file of a video taken at two or more rates in an imaging device (a sensor), and of playing the video file, which includes images recorded at two or more different rates in this recording process.

Figure 1:
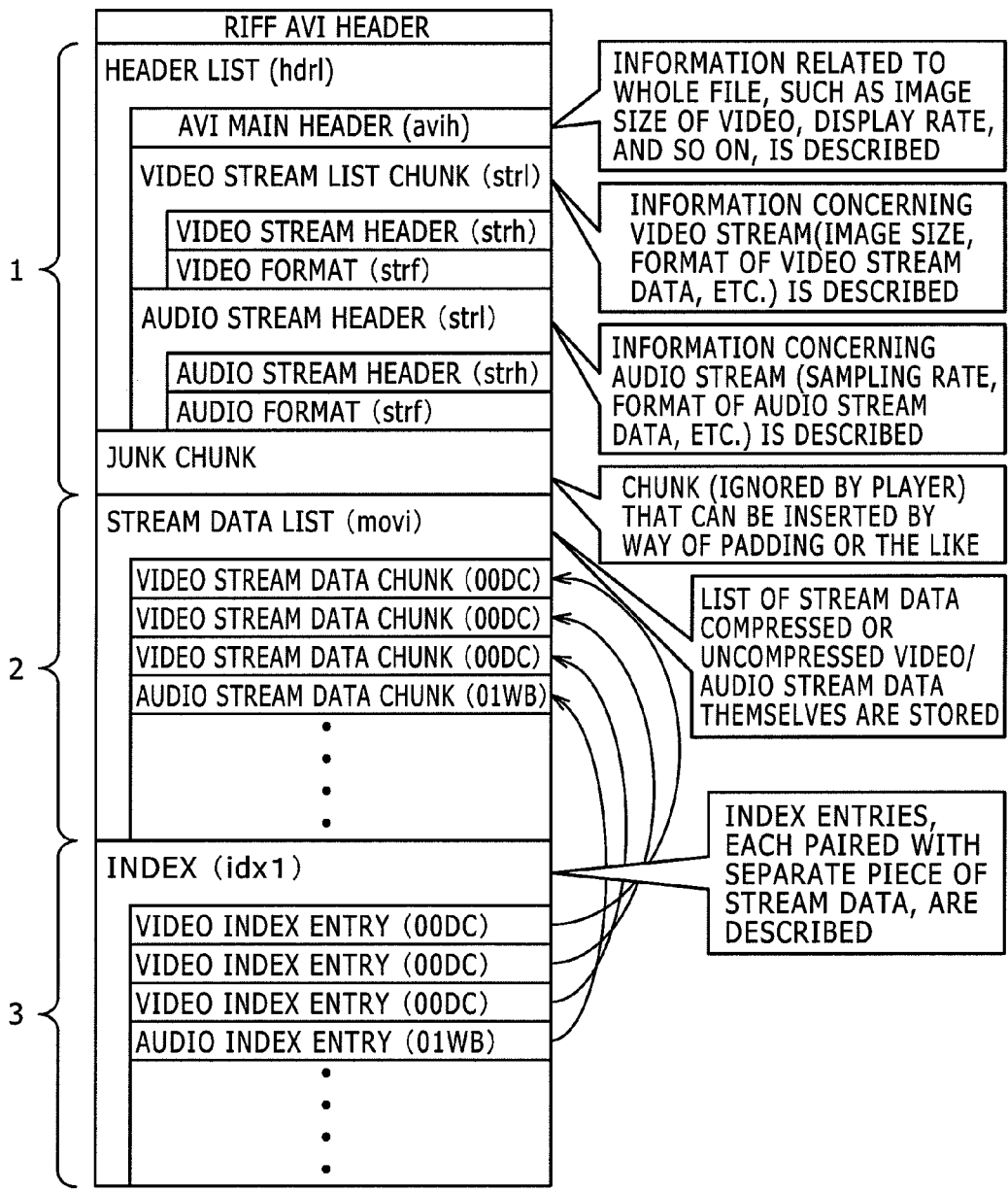
FIG. 1 illustrates an RIFF AVI file format.

Thus, the image processing apparatus according to the present embodiment is capable of controlling the recording and playback of images without disturbing a common RIFF file format as illustrated in FIG. 1, for example, so that a video recorded at two or more different frame rates can be played normally at a fixed rate and played at a reduced speed at an arbitrary playback rate with simple control.

In the present embodiment, an RIFF AVI file format as illustrated in FIG. 1 is adopted as an example of a predetermined data format.

As shown in FIG. 1, the RIFF AVI file format includes a header portion 1, a stream data portion 2, and an index portion 3.

The header portion 1 includes a header list (hdrl). The header list includes: an AVI main header (avih), in which information related to a whole file, such as an image size of a video, a display rate, and so on, is described; a video stream list chunk (strl), in which information concerning a video stream (the image size, a format of video stream data, etc.) is described; an audio stream list (strl), in which information concerning an audio stream (a sampling rate, a format of audio stream data, etc.) is described; and a JUNK chunk, which is a chunk (ignored by a player) that can be inserted by way of padding or the like.

The stream data portion 2 includes a stream data list (movi), which is a list of stream data, in which compressed or uncompressed video/audio stream data themselves are stored.

The index portion 3 includes an index (idx1), in which index entries, each of which is paired with a separate piece of stream data, are described.

The structure of the camera system and operations of controlling the recording and playback of the video in the RIFF AVI file format according to the present embodiment will now be described below.

The camera system 10 includes: an optical system 11; an image sensor (an imaging device) 12, which is formed by a CCD or CMOS sensor; an analog signal processing section 13; an analog to digital (A/D) converter 14; a sensor control section 15; a digital signal processing section 16; an image compression/decompression section 17; an image memory 18; a scaler 19; a display device interface (I/F) 20; a display device 21; a control CPU 22, which functions as a control section; an operation device 23; a control memory 24; a storage interface (I/F) 25; and a storage medium 26, which functions as a storage section and is formed by a memory used for external storage.

In the camera system 10, the sensor control section 15, the digital signal processing section 16, the image compression/decompression section 17, the scaler 19, the display device interface 20, and the control CPU 22 are connected to one another via a bus 27. The control CPU 22 controls operations and so on of the sensor control section 15, the digital signal processing section 16, the image compression/decompression section 17, the scaler 19, and the display device interface 20.

The optical system 11, the image sensor 12, which is formed by the CCD or CMOS sensor, the analog signal processing section 13, and so on combine to form an imaging section.

The camera system 10 according to the present embodiment is capable of recording a video file of a video taken at two or more rates in the image sensor 12, and has a function of playing the video file, which includes images recorded at two or more different rates in this recording process.

The camera system 10 according to the present embodiment is so configured that an imaging process at the image sensor 12, signal processing at the digital signal processing section 16, and image compression at the image compression/decompression section 17 can be performed at a rate of 60, 90, 120, or 240 fps, for example.

An outline of functions of the components of the camera system 10 as shown in FIG. 2 will now be described below.

The optical system 11 has a lens as its primary component, and allows an image of a subject (not shown) to be formed on a photosensitive surface of the image sensor 12, which is the imaging device.

The image sensor 12 subjects information of the subject image formed via the optical system 11 to optical-to-electrical conversion, and outputs a result to the analog signal processing section 13.

The analog signal processing section 13 subjects the analog output from the image sensor 12 to correlated double sampling (CDS), analog amplification, and so on, and outputs resultant analog image data to the A/D converter 14.

The A/D converter 14 converts the analog image data outputted from the analog signal processing section 13 into a digital signal, and outputs the resultant digital signal to the digital signal processing section 16.

Under control of the control CPU 22, the sensor control section 15 controls an input rate and imaging timing at the image sensor 12, and so on.

Under control of the control CPU 22, the digital signal processing section 16 performs a process of determining a shutter speed before imaging, a process of adjusting brightness and color of images taken, and so on.

Under control of the control CPU 22, the image compression/decompression section 17 compresses data of the images taken in accordance with a predetermined compression system, and writes the resultant compressed image data to the image memory 18, which is a storage medium, and also reads the image data from the image memory 18 and decompresses the read image data, for example.

Under control of the control CPU 22, the scaler 19 functions as an image generation section to generate, from the image data stored in the image memory 18, images to be displayed.

Under control of the control CPU 22, the display device interface 20 outputs image data to be displayed to the display device 21 to be displayed thereon.

Examples of the display device 21 include a liquid crystal display device (LCD) and so on.

The control CPU 22 controls the digital signal processing section 16, the image compression/decompression section 17, and the entire circuitry.

The control CPU 22 controls the recording or playback in accordance with an operation performed on the operation device 23 via a human interface (not shown). This control operation will be described in detail later.

The operation device 23 includes a shutter button, a jog dial, a touch panel, and so on.

Figure 3:
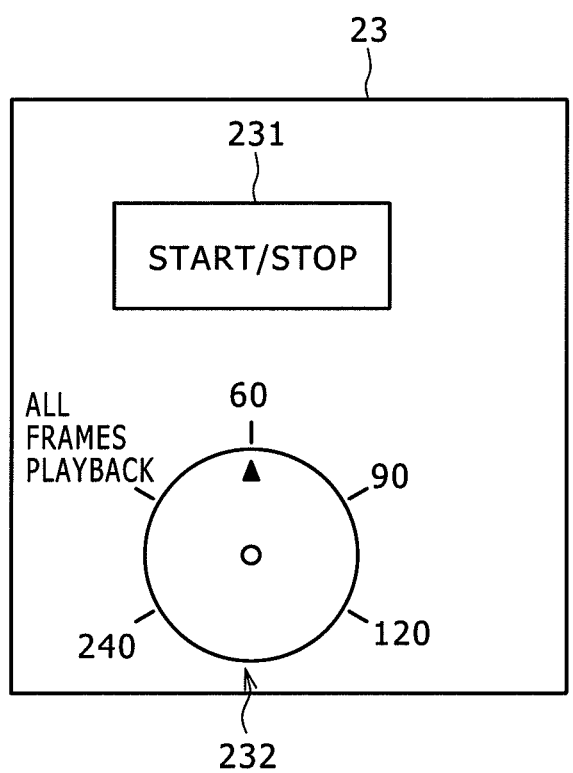
FIG. 3 shows an exemplary structure of primary parts of an operation device according to the present embodiment.

FIG. 3 shows an exemplary structure of primary parts of the operation device according to the present embodiment.

As shown in FIG. 3, the operation device 23 includes a recording/playback start/stop switch (e.g., a push button) 231, a recording/playback rate change switch (e.g., a dial) 232, and so on.

Examples of the storage medium 26, which functions as a memory for storing the images, include an HDD, a DVD, and a flash memory, which is a nonvolatile memory.

Next, the control at the time of recording and the control at the time of playback according to the above-described structure will be described below.

First, the control at the time of the recording will now be described below with reference to FIGS. 4, 5, 6, 7, 8, 9, 10, 11, 12, and 13.

Control at the Time of Recording

Figure 4:
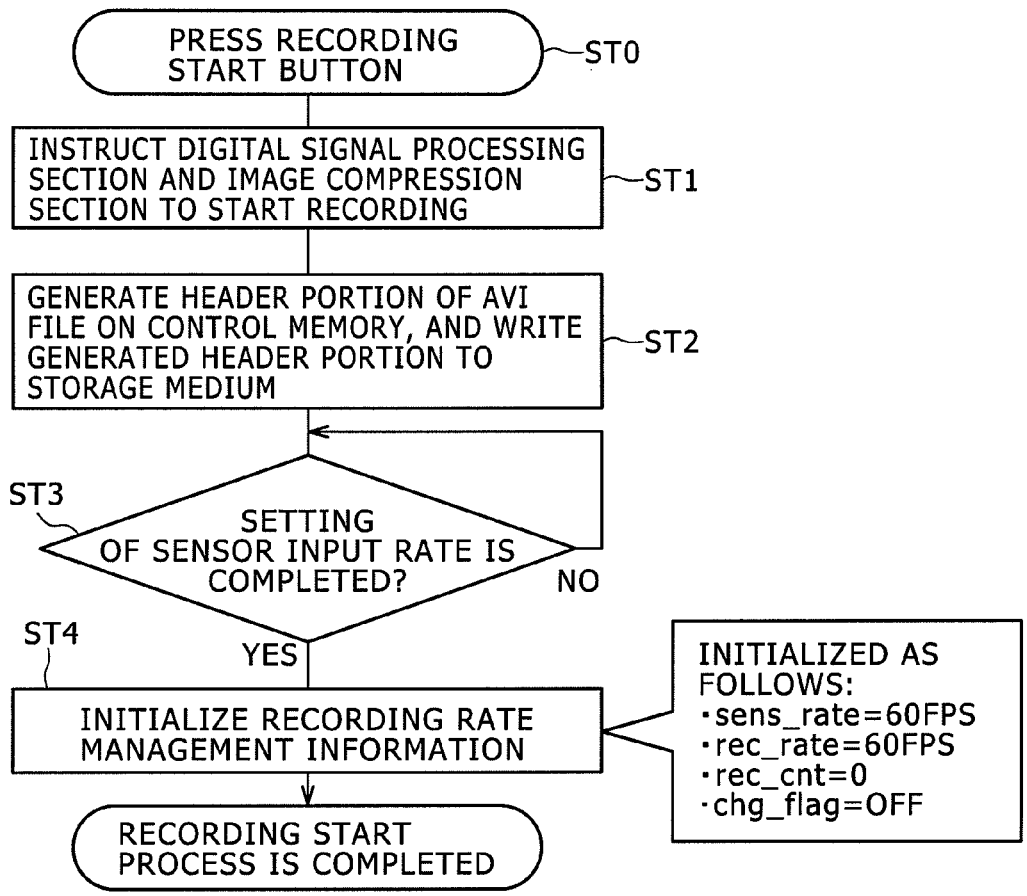
FIG. 4 is a flowchart illustrating a process of starting a recording operation according to the present embodiment.

At the time of the recording, a control program on the control CPU 22 starts a recording operation in accordance with a flow as shown in FIG. 4, when the start/stop switch (i.e., a recording start button) 231 on the operation device 23 has been pressed.

FIG. 4 is a flowchart illustrating a process of starting the recording operation according to the present embodiment.

In the process as shown in FIG. 4, when the start/stop switch (i.e., the recording start button) 231 on the operation device 23 is pressed (ST0), the control CPU 22 (to be precise, the control program on the control CPU 22) instructs the digital signal processing section 16 and an image compression section in the image compression/decompression section 17 to start the recording (ST1).

Next, the control CPU 22 generates the header portion 1 of an AVI file on the control memory 24, and writes the generated header portion 1 to the storage medium 26 via the storage interface 25 (ST2).

Next, after setting of the input rate at the image sensor 12 is completed (ST3), the control CPU 22 initializes recording rate management information (ST4).

The recording rate management information is formed (prepared) on the control memory 24 as management information for controlling the sensor input rate and rate change at the time of the recording.

Figure 5:
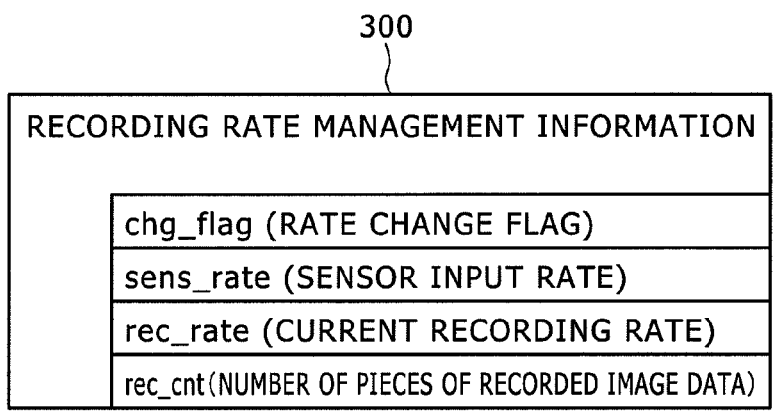
FIG. 5 shows an exemplary data structure of recording rate management information according to the present embodiment.

FIG. 5 shows an exemplary data structure of the recording rate management information according to the present embodiment.

Recording rate management information 300 as shown in FIG. 5 includes a rate change flag chg_flag, a sensor input rate sens_rate, a current recording rate rec_rate, and the number of pieces of recorded image data rec_cnt.

As shown in FIG. 4, as a result of the initialization of the recording rate management information 300 at step ST4, the sensor input rate sens_rate and the current recording rate rec_rate are set at 60 fps, the number of pieces of recorded image data rec_cnt is set at 0, and the rate change flag chg_flag is set to OFF.

Figure 6:
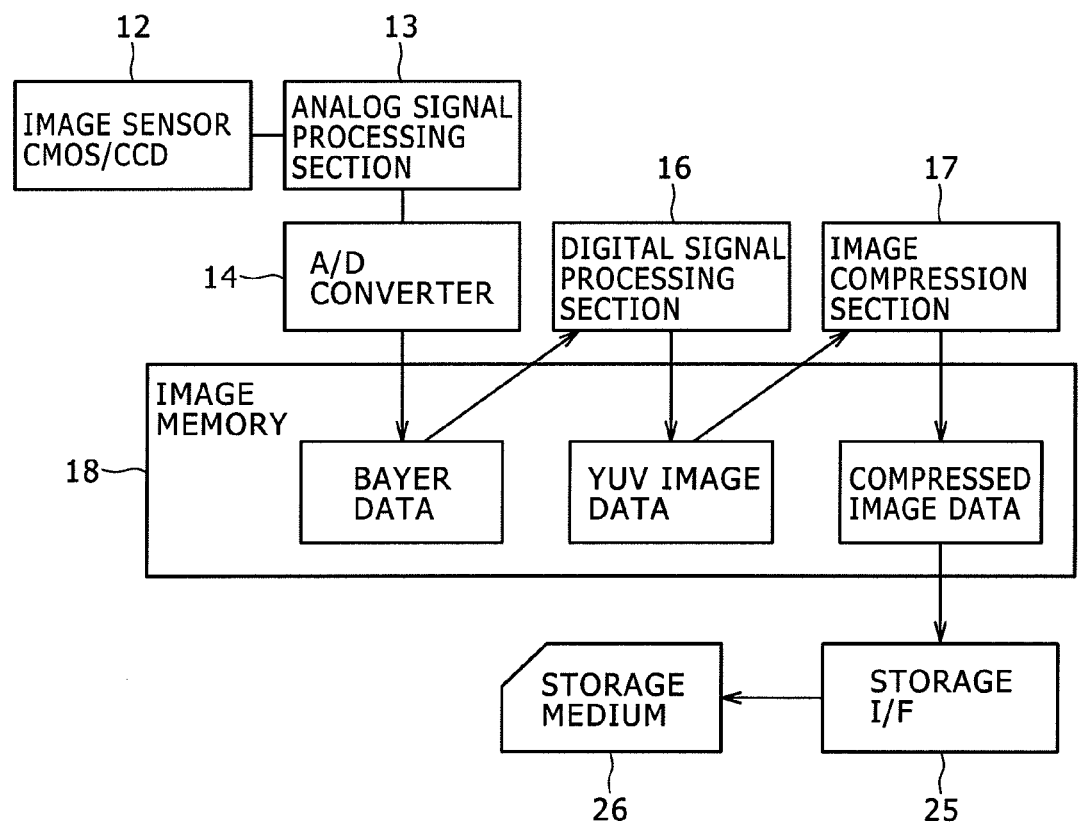
FIG. 6 illustrates a data flow in the camera system when video recording (imaging) has been started.

Next, when video recording (imaging) has been started, as shown in a data flow of FIG. 6, the compressed image data is outputted onto the image memory 18, and upon output of the compressed image data, the control CPU 22 is notified thereof.

Specifically, under control of the sensor control section 15, the information of the subject images formed on an imaging surface, which are captured at the initial input rate of 60 fps via the optical system 11, is subjected to the optical-to-electrical conversion in the image sensor 12, and outputted to the analog signal processing section 13.

In the analog signal processing section 13, the analog output from the image sensor 12 is subjected to the correlated double sampling (CDS), the analog amplification, and so on. Then, the resultant analog image data is converted into the digital signal by the A/D converter 14, and the resultant digital signal is inputted to the digital signal processing section 16 after being temporarily stored in the image memory 18, for example.

Under control of the control CPU 22, the digital signal processing section 16 performs the process of determining the shutter speed before imaging, the process of adjusting the brightness and color of the images taken, and so on, and the resultant image data is stored in the image memory 18.

The image data stored in the image memory 18 is read out to the image compression section in the image compression/decompression section 17, the image data is compressed therein in accordance with the predetermined compression system, and the resulting compressed image data is written to (stored in) the image memory 18.

Then, the compressed image data stored in the image memory 18 is recorded on the storage medium 26 via the storage interface 25.

The control program on the control CPU 22, being notified thereof, performs a compressed data output notification detection process.

Figure 7:
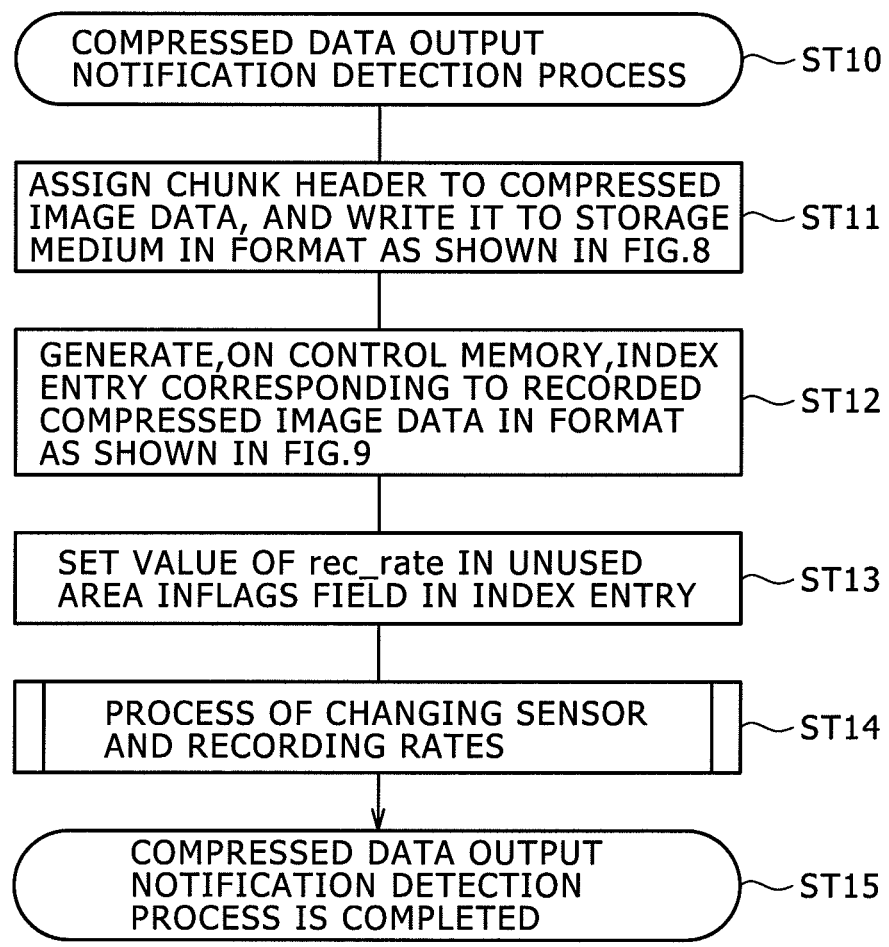
FIG. 7 is a flowchart illustrating a compressed data output notification detection process, which is performed at the time of recording, according to the present embodiment.

FIG. 7 is a flowchart illustrating the compressed data output notification detection process, which is performed at the time of the recording, according to the present embodiment.

Figure 8:
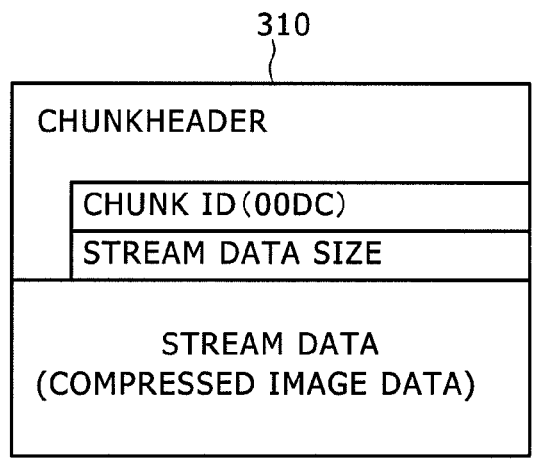
FIG. 8 shows the structure of a chunk header, which is assigned to compressed data.

FIG. 8 shows the structure of a chunk header, which is assigned to the compressed data.

Figure 9:
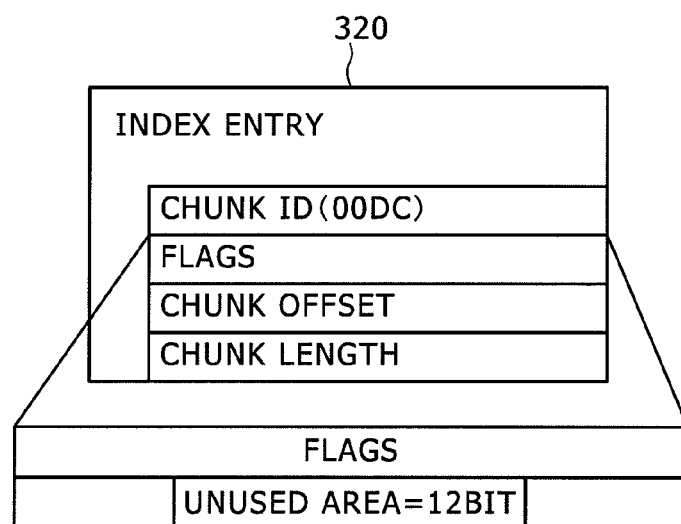
FIG. 9 shows the structure of an index entry, which is formed on a control memory.

FIG. 9 shows the structure of an index entry, which is formed on the control memory.

In the compressed data output notification detection process, the control program on the control CPU 22, having received the notification, assigns a chunk header 310 to the compressed image data recorded on the storage medium 26 via the storage interface 25, and writes the chunk header 310 to the storage medium 26 in a format as shown in FIG. 8 (ST11).

Then, the control CPU 22 forms (generates), on the control memory 24, data of an index entry 320 corresponding to the recorded compressed image data in a format as shown in FIG. 9 (ST12).

As shown in FIG. 9, the data of the index entry 320 formed on the control memory 24 includes a chunk ID, flags, a chunk offset, and a chunk length. Each of these pieces of data is 32 bits long.

Figure 10:
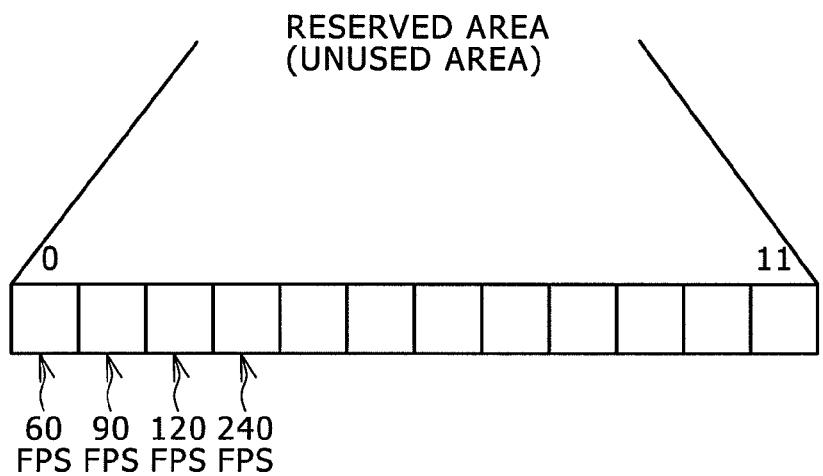
FIG. 10 shows an exemplary manner of storing a recording rate in an unused area in a flags area.

An area of the flags in the index entry 320 includes an unused area of 12 bits. Accordingly, as shown in FIG. 10, for example, a numerical value representing the recording rate is stored in this unused area (alternatively, it may be so arranged that different rates are assigned to different bits, and that "1" is set in a bit corresponding to the recording rate). The recording rate rec_rate is stored within data that is paired with the image data, which has been written as the stream data (ST13).

Then, the control CPU 22 performs a process of changing the input rate at the image sensor and the recording rate (ST14).

Figure 11:
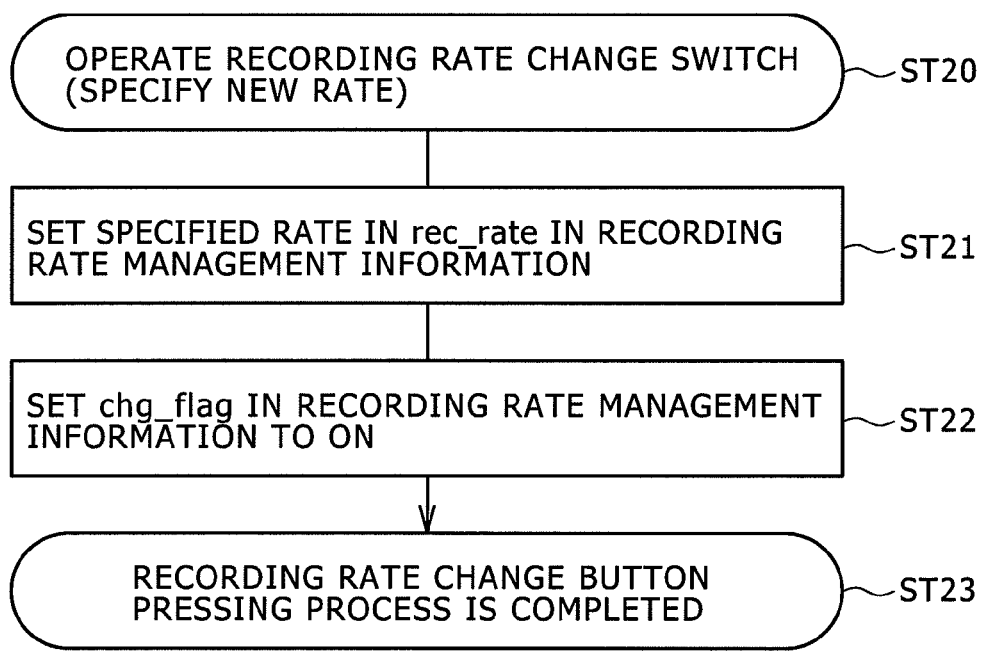
FIG. 11 is a flowchart illustrating a process that is performed when a recording/playback rate change switch has been operated during the recording operation.

FIG. 11 is a flowchart illustrating a process that is performed when the recording/playback rate change switch has been operated during the recording operation.

Figure 12:
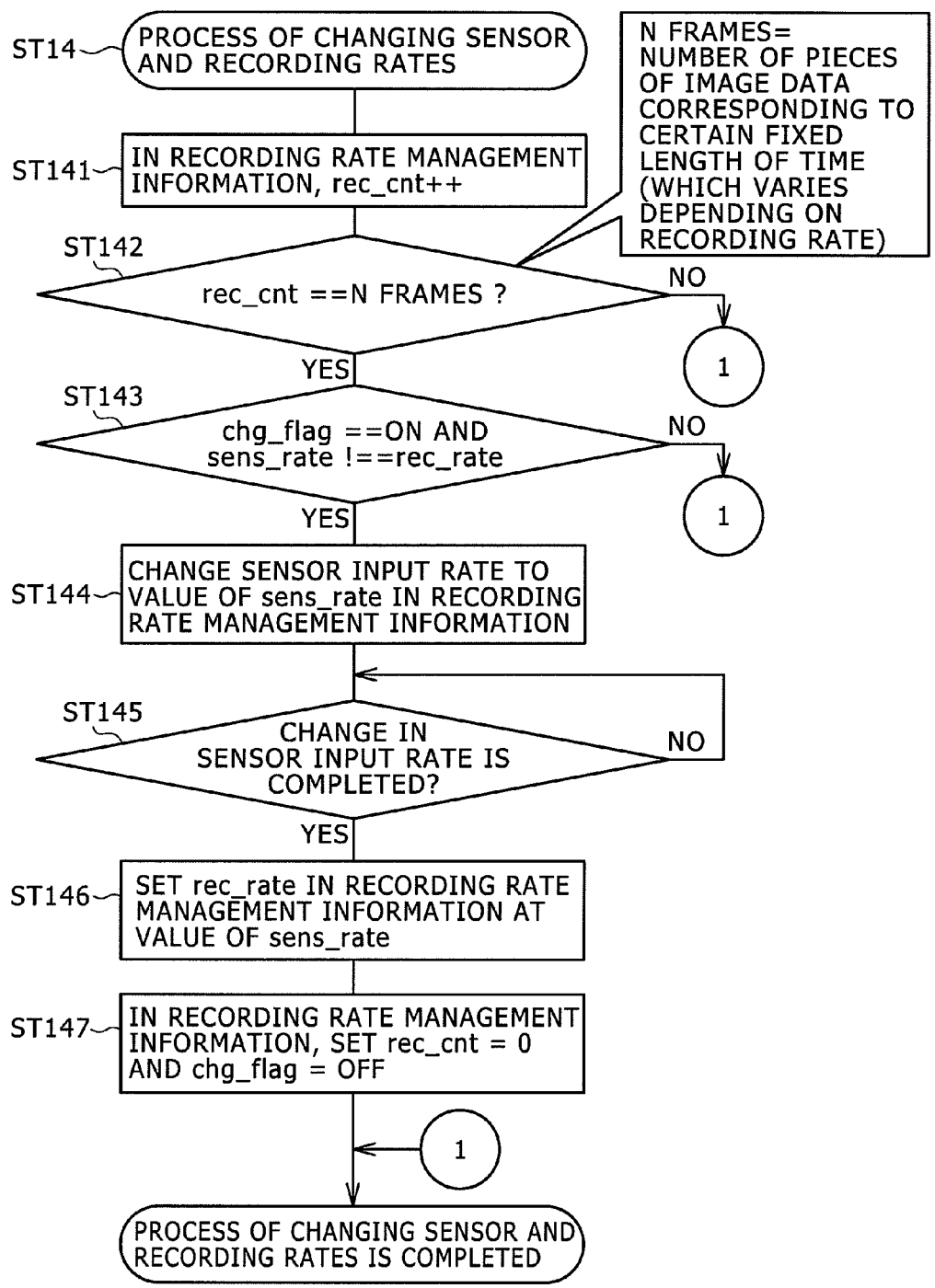
FIG. 12 is a flowchart specifically illustrating a process of changing an input rate at an image sensor and the recording rate as shown in FIG. 9.

FIG. 12 is a flowchart specifically illustrating the process of changing the input rate at the image sensor and the recording rate as shown in FIG. 9.

Referring to FIG. 11, when the recording/playback rate change switch 232 has been operated during the recording operation, the control CPU 22 sets a rate specified by this operation in the recording rate rec_rate in the recording rate management information 300 (ST21). In other words, the control CPU 22 updates the recording rate rec_rate in the recording rate management information 300 to the specified rate.

Then, in order to indicate that a change has been made in the recording rate, the control CPU 22 sets the rate change flag chg_flag in the recording rate management information 300 to ON (ST22).

Next, the control CPU 22 performs the process of changing the input rate at the image sensor and the recording rate as shown in FIG. 12.

Note that, for the sake of playback control, which will be described later, the change in the input rate is carried out when image data of a certain fixed length of time (data of N frames) has been recorded, so that image data and index entries with the same recording rate will be recorded in units of N successive frames.

Referring to FIG. 12, in the process of changing the rates, the number of pieces of recorded image data rec_cnt in the recording rate management information 300 is incremented (ST141).

Next, it is determined whether the number of pieces of recorded image data rec_cnt has reached N frames (ST142). If it is determined that the number of pieces of recorded image data rec_cnt has reached N frames, it is determined whether or not the rate change flag chg_flag in the recording rate management information 300 is ON and the sensor input rate sens_rate is equal to the recording rate rec_rate (ST143).

If an affirmative determination result is obtained at step ST143, the sensor input rate is changed to a value of the sensor input rate sens_rate in the recording rate management information 300 (ST144).

Then, the number of pieces of recorded image data rec_cnt in the recording rate management information 300 is set at 0, and the rate change flag chg_flag is set to OFF (ST147).

Thus, the process of changing the input rate at the image sensor and the recording rate is completed.

Figure 13:
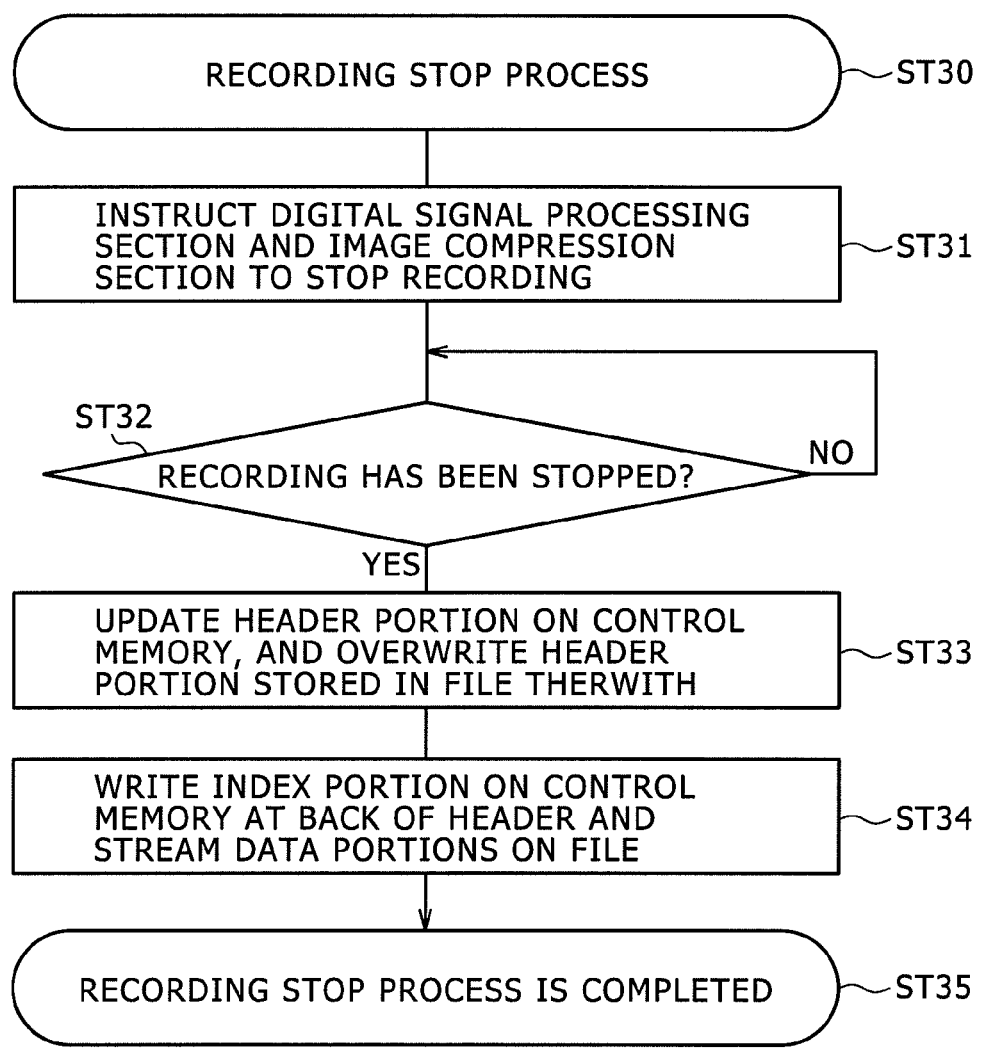
FIG. 13 is a flowchart illustrating a recording stop process.

FIG. 13 is a flowchart illustrating a recording stop process according to the present embodiment.

Upon detection of pressing of the start/stop switch (a recording stop button) 231 on the operation device 23 or exhaustion of free space in the storage medium 26, the control program on the control CPU 22 performs control as shown in the flowchart of FIG. 13.

The control CPU 22 instructs the digital signal processing section 16 and the image compression section in the image compression/decompression section 17 to stop the recording (ST31).

When the recording has been stopped (ST32), the header portion 1 on the control memory 24 is updated, and the header portion stored in the file is overwritten therewith (ST33).

Next, the index portion 3 on the control memory 24 is combined with the header portion 1 and the stream data portion 2 of the AVI file recorded on the storage medium 26 to generate the AVI file, whereby a series of recording operations is completed (ST34 and ST35).

Next, the control at the time of the playback will now be described below with reference to FIGS. 14, 15, 16, 17, 18, 19, 20, 21, 22A, 22B, 23A, and 23B.

Control at the Time of Playback

Figure 14:
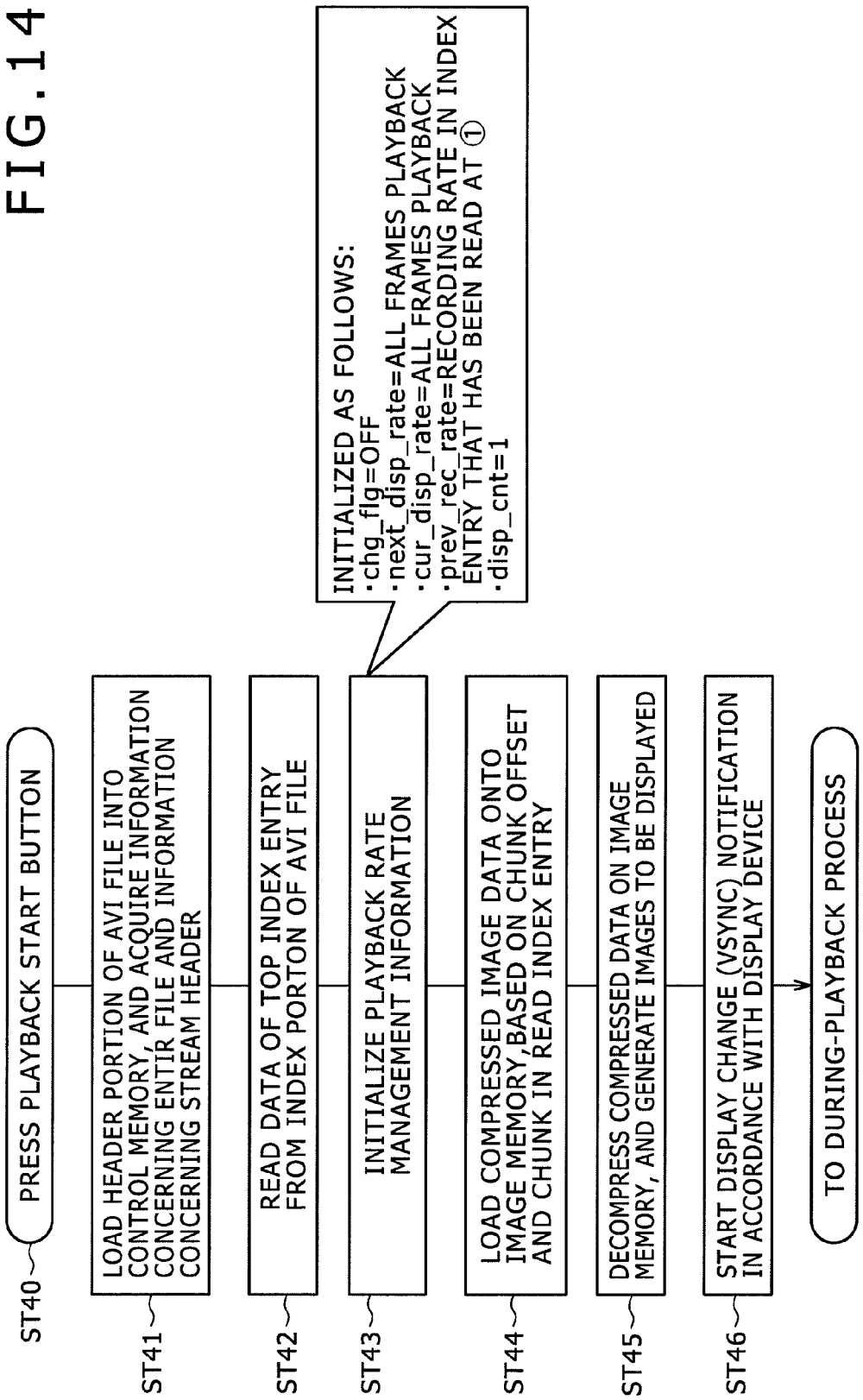
FIG. 14 is a flowchart illustrating a playback operation start process according to the present embodiment.

When the start/stop switch (a playback start button) 231 on the operation device 23 is pressed while an AVI file to be played is being selected, a playback operation is started in accordance with a flow as shown in FIG. 14.

FIG. 14 is a flowchart illustrating a playback operation start process according to the present embodiment.

In the process as shown in FIG. 14, when the start/stop switch (i.e., the playback start button) 231 on the operation device 23 is pressed (ST40), the header portion 1 of the AVI file is read out to the control memory 24, whereby information concerning the entire file and information concerning a stream header are acquired (ST41).

Next, data of the top index entry is read from the index portion 3 of the AVI file (ST42).

Next, playback rate management information is initialized (ST43).

The playback rate management information is formed on the control memory 24 as management information for controlling the change in the playback rate and update of screens displayed at the time of the playback.

Figure 15:
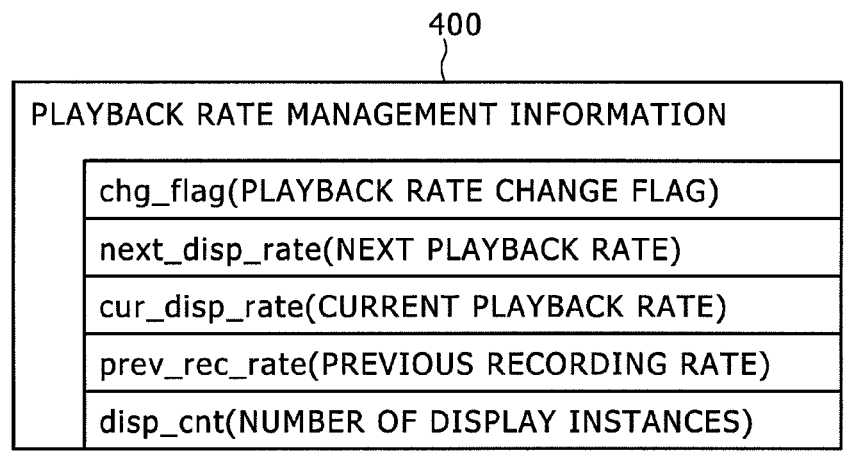
FIG. 15 shows an exemplary data structure of playback rate management information according to the present embodiment.

FIG. 15 shows an exemplary data structure of the playback rate management information according to the present embodiment.

Playback rate management information 400 as shown in FIG. 15 includes a playback rate change flag chg_flag, a next playback rate next_disp_rate, a current playback rate cur_disp_rate, a previous recording rate prev_rec_rate, and the number of display instances disp_cnt.

As shown in FIG. 14, as a result of the initialization of the playback rate management information 400, the playback rate change flag chg_flag is set to OFF, the next playback rate next_disp_rate is set to "all frames playback", the current playback rate cur_disp_rate is set to "all frames playback", the previous recording rate prev_rec_rate is set at the recording rate in the index entry read at step ST42, and the number of display instances disp_cnt is set at 1.

Figure 16:
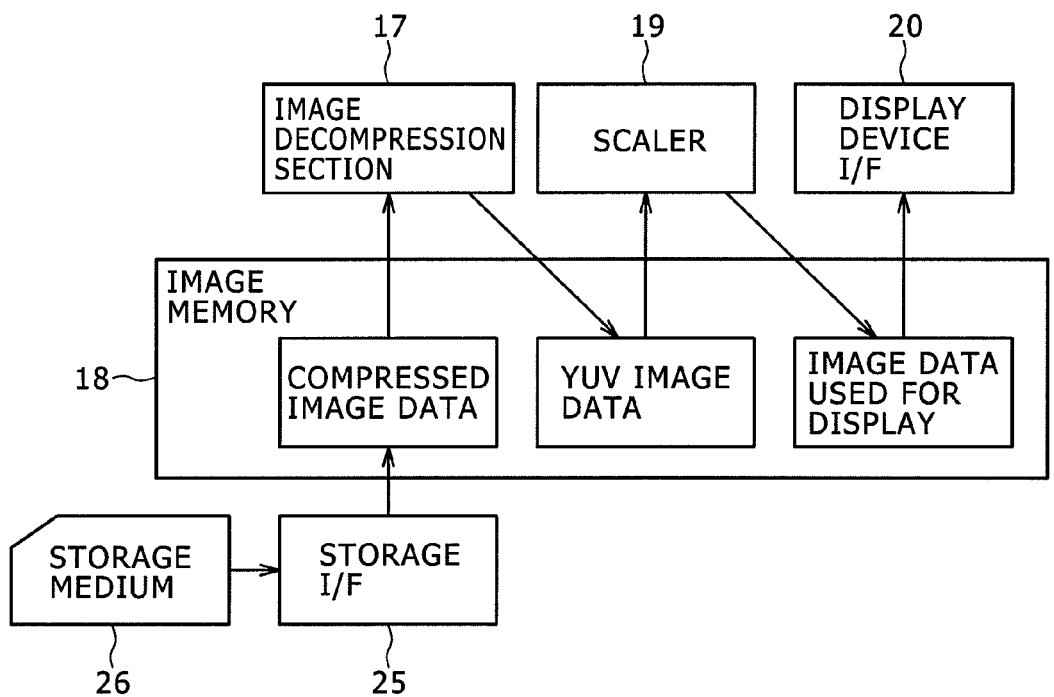
FIG. 16 illustrates a data flow in the camera system when a playback operation has been started.

When the playback operation has been started, as shown in a data flow of FIG. 16, image data used for display is generated on the image memory 18, and the images are displayed on the display device 21, such as a built-in LCD or an external monitor.

Specifically, based on the chunk offset and the chunk length in the read index entry, the compressed image data is read out onto the image memory 18 (ST44).

Next, the compressed data on the image memory 18 is decompressed by an image decompression section in the image compression/decompression section 17 and stored in the image memory 18 temporarily, and the images to be displayed are generated by the scaler 19 (ST45) and stored in the image memory 18.

Then, a display change notification (Vsync notification) in accordance with the display device 21 is started (ST46), resulting in transition to a during-playback process.

Figure 17:
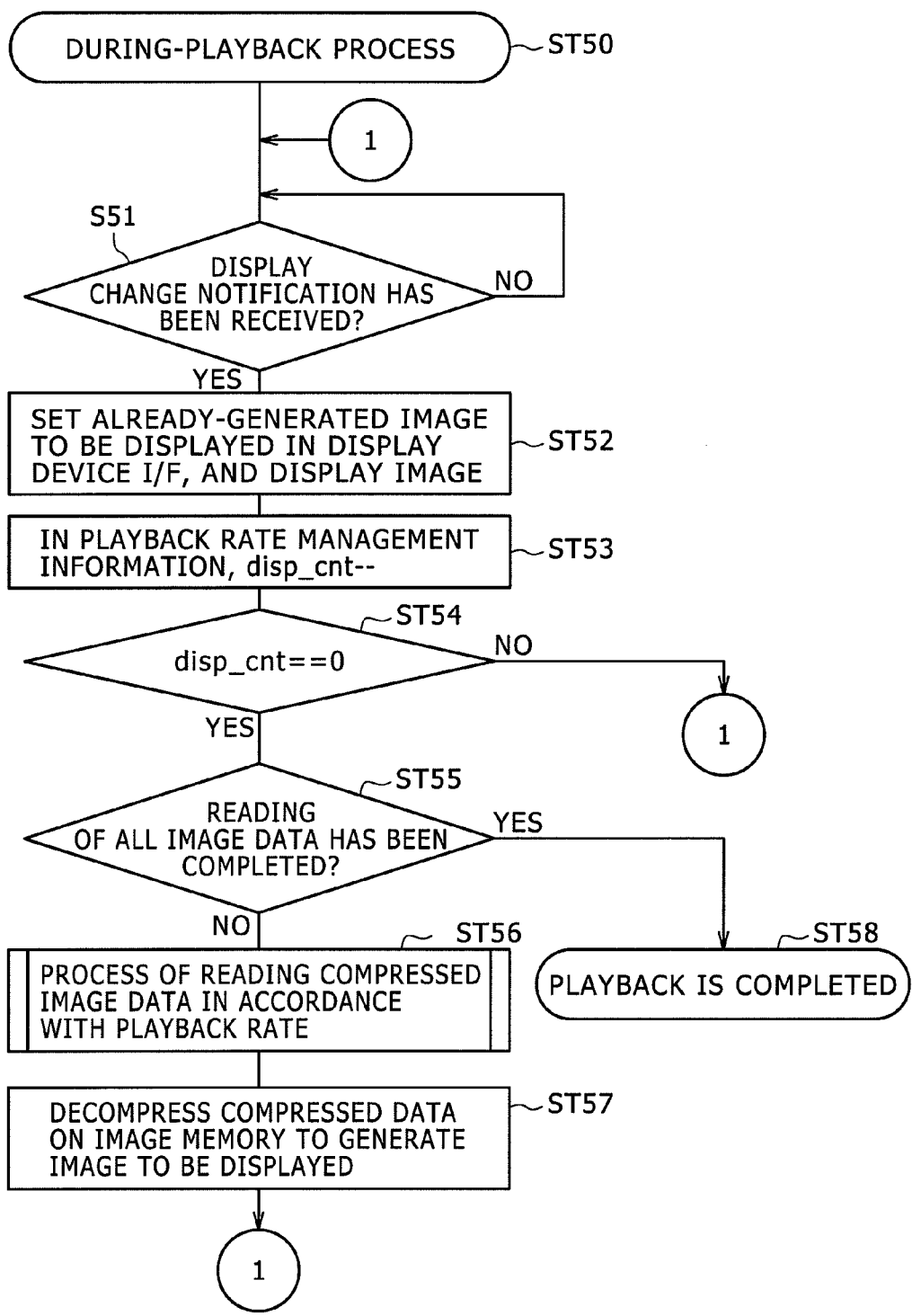
FIG. 17 is a flowchart illustrating a during-playback process according to the present embodiment.

FIG. 17 is a flowchart illustrating the during-playback process according to the present embodiment.

During the playback operation, the control program on the control CPU 22, if it receives the display change notification (i.e., the Vsync notification), continues to perform control as shown in the flowchart of FIG. 17 until reading of all image data stored in the AVI file is completed.

Upon receipt of the display change notification (ST51), an already-generated image to be displayed is set in the display device interface 20, and the image is displayed on the display device 21 (ST52).

Next, the number of display instances disp_cnt in the playback rate management information 400 is decremented (ST53), and it is determined whether the number of display instances disp_cnt has reached 0 (ST54).

If it is determined at step ST54 that the number of display instances disp_cnt has reached 0, it is determined whether the reading of all image data has been completed (ST55).

If it is determined at step ST55 that the reading of all image data has not been completed, a process of reading the compressed image data is performed in accordance with the playback rate (ST56), and the compressed data on the image memory 18 is decompressed to generate images to be displayed (ST57).

If it is determined at step ST55 that the reading of all image data has been completed, a playing process is completed.

Figure 18:
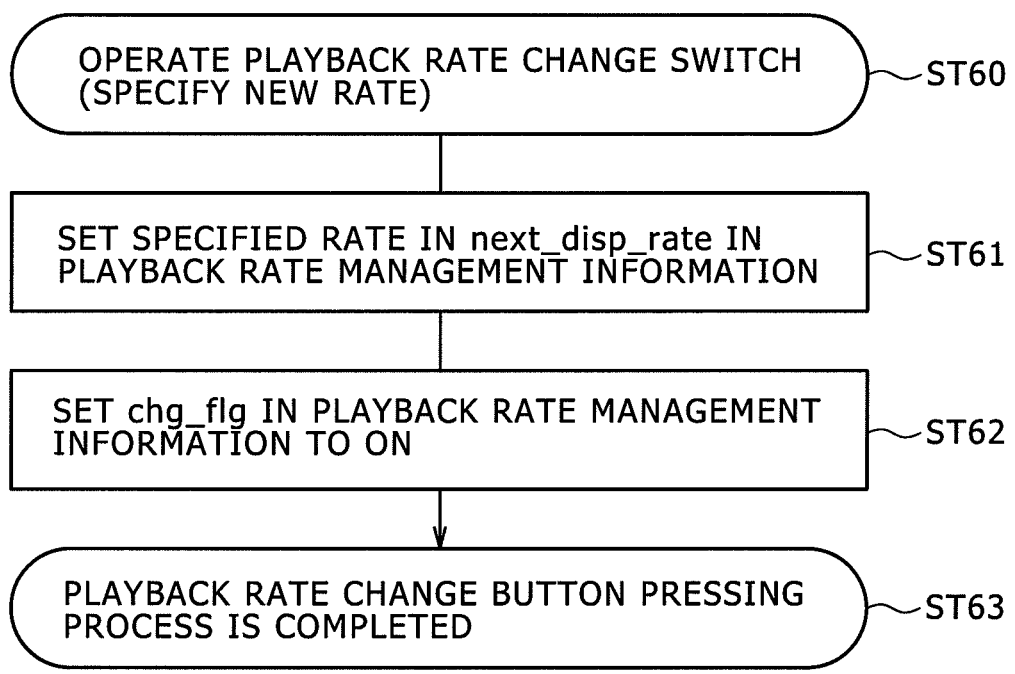
FIG. 18 is a flowchart illustrating a process that is performed when the recording/playback rate change switch has been operated during the playback operation.

FIG. 18 is a flowchart illustrating a process that is performed when the recording/playback rate change switch has been operated during the playback operation.

Figure 19:
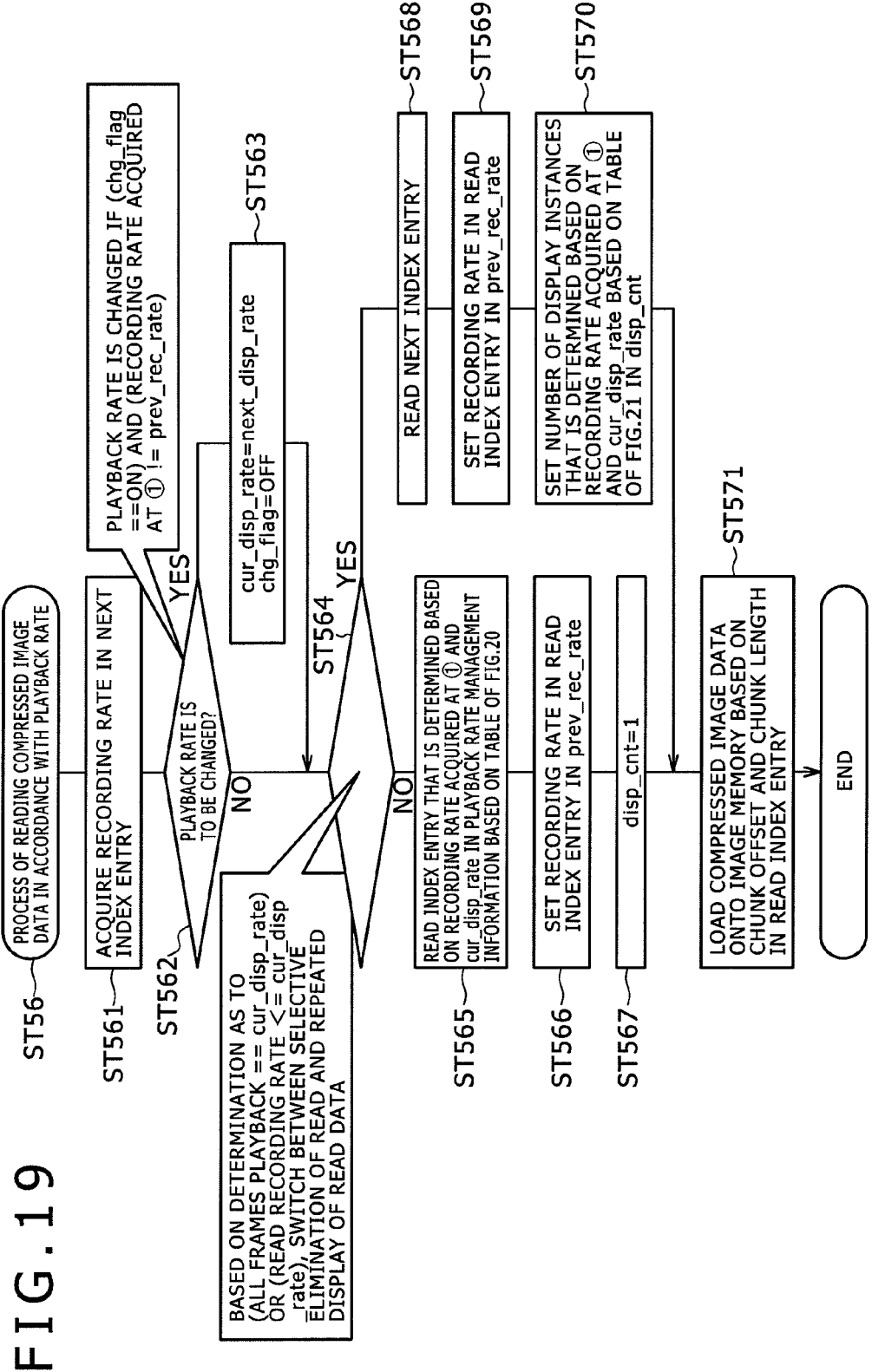
FIG. 19 is a flowchart specifically illustrating a process of reading compressed image data in accordance with a playback rate as shown in FIG. 17.

FIG. 19 is a flowchart specifically illustrating the process of reading the compressed image data in accordance with the playback rate as shown in FIG. 17.

When the recording/playback rate change switch 232 has been operated during the playback operation, the control CPU 22 sets a rate specified by this operation in the next playback rate next_disp_rate in the playback rate management information 400 in accordance with a flow of FIG. 18 (ST61). In other words, the control CPU 22 updates the next playback rate next_disp_rate in the playback rate management information 400 to the specified rate.

Then, the control CPU 22 sets the playback rate change flag chg_flag in the playback rate management information 400 to ON, in order to indicate that a change has been made in the playback rate (ST62).

Next, the control CPU 22 performs the process of reading the compressed image data in accordance with the playback rate as shown in FIG. 19.

At this time, based on the recording rate previously stored in the flags area in the index entry, it is determined whether or not the corresponding image data is to be displayed at the current playback rate, or how many times the corresponding image data is to be displayed, and the reading of the images and the output of the read images to the display device 21 are carried out.

Specifically, as shown in FIG. 19, first, the recording rate stored in a next index entry is acquired (ST561).

Next, it is determined whether the playback rate is to be changed (ST562). The control CPU 22 changes the playback rate if the playback rate change flag chg_flag in the playback rate management information 400 is ON and the recording rate acquired at step ST561 is equal to the previous recording rate prev_rec_rate in the playback rate management information 400.

If the playback rate is to be changed, the control CPU 22 changes the current playback rate cur_disp_rate in the playback rate management information 400 to the next playback rate next_disp_rate, and sets the playback rate change flag chg_flag to OFF (ST563).

Next, based on a determination as to whether or not the current playback rate cur_disp_rate is "all frames playback" and whether or not the read recording rate is equal to or lower than the current playback rate cur_disp_rate, a switch is made between selective elimination of read data and repeated display of the read data.

FIG. 20 shows an exemplary definition table of read intervals of the index entries according to the present embodiment.

FIG. 21 shows an exemplary table showing the number of times the images recorded at particular recording rates should be displayed repeatedly, when played at particular playback rates, according to the present embodiment.

In the definition table of FIG. 20, a denominator represents the number of elements in an alignment, while a numerator represents the number of pieces of data to be read.

For example, "3/8" refers to {1, 0, 0, 1, 0, 0, 1, 0} where a 1 represents an act of reading and a 0 represents an act of not reading.

FIGS. 22A and 22B illustrate an exemplary case where images recorded at 60 fps, 90 fps, 120 fps, and 240 fps are displayed in a normal manner at 60 fps (i.e., selectively eliminated in reading).

Pieces of image data that have been recorded in a manner as shown in FIG. 22A are read, with selective elimination of the image data, in a manner as shown in FIG. 22B.

In FIG. 21, a fraction refers to alignment data that defines the number of times the image data should be displayed repeatedly.

In the case of a recording rate of 90 fps and a playback rate of 240 fps, for example, the numbers of times respective pieces of image data in every nine successive pieces of image data should be displayed are defined as elements in the following alignment: {3, 3, 2, 3, 3, 2, 3, 3, 2}.

FIGS. 23A and 23B illustrate an exemplary case where images that have been recorded at 60 fps, 90 fps, 120 fps, and 240 fps are played at a reduced speed, approximately at 240 fps (i.e., with increased numbers of display instances).

Pieces of image data that have been recorded in a manner as shown in FIG. 23A are played back in a manner as shown in FIG. 23B, with increased numbers of display instances.

Returning to the process of FIG. 19, if it is determined at step ST564 that the read data is to be selectively eliminated, an index entry is read that is determined based on the recording rate acquired at step ST561 and the current playback rate cur_disp_rate in the playback rate management information 400 based on the table of FIG. 20 (ST565).

Next, the recording rate in the read index entry is set in the previous recording rate prev_rec_rate in the playback rate management information 400 (ST566).

Then, the number of display instances disp_cnt in the playback rate management information 400 is set at 1 (ST567).

If it is determined at step ST564 that the read data is to be displayed repeatedly, the next index entry is read (ST568).

Next, the recording rate in the read index entry is set in the previous recording rate prev_rec_rate in the playback rate management information 400 (ST569).

Next, the number of display instances that is determined based on the recording rate in the read index entry and the current playback rate cur_disp_rate based on the table of FIG. 21 is set in the number of display instances disp_cnt in the playback rate management information 400 (ST570).

After the process of step ST567 or step ST570, the compressed image data is read out onto the image memory 18 based on the chunk offset and the chunk length in the read index entry (ST571).

As described above, at the time of the recording, the recording rate is embedded in the index entry, which is data that is paired with the stream data, whereas at the time of the playback, the recording rate embedded in the index entry at the time of the recording is referred to. This makes it possible to play, at an arbitrary playback rate, a video that has been recorded at a plurality of recording rates, as shown in FIGS. 22A, 22B, 23A, and 23B.

At the time of the recording, the recording rate is changeable only in units of the fixed length of time (N frames), as described above. Because of this, the read intervals of the index entries and the number of display instances to be repeated at the time of the playback can be expressed by repetitions of certain fixed patterns as shown in FIGS. 20 and 21.

While the RIFF AVI file format has been described as an exemplary file format in the present embodiment, other file formats, such as an MPEG format, are also applicable. For example, instead of the index entry, a user data (user_data) field in the MPEG may be used to store the recording rate on an image-by-image basis at the time of the recording, and the recording rate stored therein may be referred to at the time of the playback. Thus, similar control can be accomplished without disturbing the common file format.

Further, in the case of an AVI file format, the recording rate may be stored in an area that can be used arbitrarily by a user during compression data formatting for a stream data body, for example, in a comment (COM) marker in the case of JPEG. In this case also, similar control can be accomplished.

As described above, the present embodiment produces the following effects.

The generation of a video file can be achieved easily at the time of the recording, because the only requirement is that the recording rate is stored in each frame in the video file.

Because only a limited expansion is needed to common file formats, even player software on a common PC is capable of accomplishing playback of the video at varied rates.

When the playback control is performed in the manner as described above in the present embodiment, the playback rate can be changed by a user operation or the like so that the video file is played at a fixed low frame rate of 60 fps or that a part of the video file which has been recorded at a high rate can be played.

In the case where an audio output unit that is capable of linearly changing a sampling rate is added to the camera system 10 as shown in FIG. 2, it may be so arranged that the recording rate of the images is assigned to audio data recorded at a fixed sampling rate, and that an output rate of the audio data is so controlled, in a similar manner to that in the case of the output of the images, that the audio data will be synchronized with the image data. Thus, the playback of a video at varied rates can be achieved with accompanying audio.

Note that the method as described in detail above can be implemented by a program that executes the above-described procedures. Such a program may be executed by a computer such as a CPU.

Also note that such a program may be stored in a storage medium, such as a semiconductor memory, a magnetic disk, an optical disc, or a floppy (R) disk, and that the program may be accessed and executed by a computer on which the storage medium is mounted.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus capable of performing processes of recording and playing image data at a plurality of frame rates, the apparatus comprising:
   a storage section; and
   a control section configured to, when performing the process of recording the image data at each of the frame rates, embed a numerical value representing a recording rate corresponding to the frame rate in an unused area included in an area of flags in an index entry that is paired with stream data to be recorded by setting a plurality of values in a plurality of bits of the unused area in the flag area, in accordance with a predetermined file format, store the numerical value in said storage section, and update recording rate management information, which includes a rate change flag indicating whether a change has been made in the recording rate corresponding to the frame rate at which the image data is recorded, a sensor input rate which is an input rate of an image sensor, a current recording rate, and the number of pieces of recorded image data, wherein each bit of the plurality of bits of the unused area in the flag area is assigned to a respective recording rate corresponding to one of the plurality of frame rates, a particular bit corresponding to the current recording rate is set at a first value, and the other bits of the plurality of bits are set at a second value which is different from the first value, and wherein the recording rate management information is stored in control memory for controlling the sensor input rate and rate change during the process of recording.

2. The image processing apparatus according to claim 1, wherein, when performing the process of playing the recorded image data, said control section reads the numerical value representing the recording rate stored in said storage section to perform the playing process.

3. The image processing apparatus according to claim 2, wherein, upon receipt of an instruction to change a playback rate for the image data, said control section determines, based on the stored numerical value representing the recording rate, whether or not the image data is to be displayed at a current playback rate, or how many times the image data is to be displayed, to read the image data.

4. The image processing apparatus according to claim 2, wherein, based on a determination as to whether or not a current playback rate is all frames playback and whether or not the read recording rate is equal to or lower than the current playback rate, said control section switches between selective elimination of read data and repeated display of the read data.

5. The image processing apparatus according to claim 4, wherein
when the read recording rate is equal to or lower than the current playback rate, said control section displays the read data repeatedly, and
when the read recording rate is not equal to or lower than the current playback rate, said control section selectively eliminates the read date when displaying the read data.

6. The image processing apparatus according to claim 4, wherein, upon receipt of an instruction to change the recording rate for the image data, said control section records the image data at a recording rate specified by the instruction, and sets the numerical value representing the recording rate corresponding to the frame rate in the data area, in accordance with the predetermined file format, that is paired with the stream data to be recorded, and stores the numerical value in said storage section.

7. The image processing apparatus according to claim 1, wherein, upon receipt of an instruction to change the recording rate for the image data, said control section records the image data at a recording rate specified by the instruction, and sets the numerical value representing the recording rate corresponding to the frame rate in the data area, in accordance with the predetermined file format, that is paired with the stream data to be recorded, and stores the numerical value in said storage section.

8. An imaging apparatus, comprising:
an imaging section configured to take an image of a subject and output image data thereof; and
an image processing apparatus configured to perform a predetermined process on the image data, wherein
said image processing apparatus includes
a storage section, and
a control section configured to, when performing a process of recording the image data at each of frame rates, embed a numerical value representing a recording rate corresponding to the frame rate in an unused area included in an area of flags in an index entry that is paired with stream data to be recorded by setting a plurality of values in a plurality of bits of the unused area in the flag area, in accordance with a predetermined file format, store the numerical value in the storage section, and update recording rate management information, which induces a rate change flag indicating whether a change has been made in the recording rate corresponding to the frame rate at which the image data is recorded, a sensor input rate which is an input rate of an image sensor, a current recording rate, and the number of pieces of recorded image data, wherein each bit of the plurality of bits of the unused area in the flag area is assigned to a respective recording rate corresponding to one of the plurality of frame rates, a particular bit corresponding to the current recording rate is set at a first value, and the other bits of the plurality of bits are set at a second value which is different from the first value, and wherein the recording rate management information is stored in control memory for controlling the sensor input rate and rate change during the process of recording.

9. The imaging apparatus according to claim 8, wherein, when performing a process of playing the recorded image data, the control section reads the numerical value representing the recording rate stored in the storage section to perform the playing process.

10. The imaging apparatus according to claim 9, wherein, upon receipt of an instruction to change a playback rate for the image data, the control section determines, based on the stored numerical value representing the recording rate, whether or not the image data is to be displayed at a current playback rate, or how many times the image data is to be displayed, to read the image data.

11. The imaging apparatus according to claim 9, wherein, based on a determination as to whether or not a current playback rate is all frames playback and whether or not the read recording rate is equal to or lower than the current playback rate, the control section switches between selective elimination of read data and repeated display of the read data.

12. The imaging apparatus according to claim 11, wherein
when the read recording rate is equal to or lower than the current playback rate, the control section displays the read data repeatedly, and
when the read recording rate is not equal to or lower than the current playback rate, the control section selectively eliminates the read date when displaying the read data.

13. The imaging apparatus according to claim 12, wherein, upon receipt of an instruction to change the recording rate for the image data the control section changes the recording rate and an input rate at said imaging section to a recording rate specified by the instruction to record the image data, and sets the numerical value representing the recording rate corresponding to the frame rate in the data area, in accordance with the predetermined file format, that is paired with the stream data to be recorded, and stores the numerical value in the storage section.

14. The imaging apparatus according to claim 13, wherein the control section changes the input rate at a time when image data corresponding to a predetermined length of time has been recorded.

15. The imaging apparatus according to claim 8, wherein, upon receipt of an instruction to change the recording rate for the image data, the control section changes the recording rate and an input rate at said imaging section to a recording rate specified by the instruction to record the image data, and sets the numerical value representing the recording rate corresponding to the frame rate in the data area, in accordance with the predetermined file format, that is paired with the stream data to be recorded, and stores the numerical value in the storage section.

16. The imaging apparatus according to claim 15, wherein the control section changes the input rate at a time when image data corresponding to a predetermined length of time has been recorded.

17. The imaging apparatus according to claim 8, wherein the control section changes the sensor input rate to a value corresponding to the numerical value representing the recording rate when the number of pieces of recorded image data reaches a predetermined number.

18. An image processing method of performing processes of recording and playing image data at a plurality of frame rates, the method comprising the steps of:
when performing the process of recording the image data at each of the frame rates, embedding a numerical value representing a recording rate corresponding to the frame rate in an unused area included in an area of flags in an index entry that is paired with stream data to be recorded by setting a plurality of values in a plurality of bits of the unused area of the flag area, in accordance with a predetermined file format, storing the numerical value in a storage section, and updating recording rate management information, which includes a rate change flag indicating whether a change has been made in the recording rate corresponding to the frame rate at which the image data is recorded, a sensor input rate which is an input rate of an image sensor, a current recording rate, and the number of pieces of recorded image data,
wherein each bit of the plurality of bits of the unused area in the flag area is assigned to a respective recording rate corresponding to one of the plurality of frame rates, a particular bit corresponding to the current recording rate is set at a first value, and the other bits of the plurality of bits are set at a second value which is different from the first value, and
wherein the recording rate management information is stored in control memory for controlling the sensor input rate and rate change during the process of recording; and
when performing the process of playing the recorded image data, reading the numerical value representing the recording rate stored in the storage section to perform the playing process.

19. A non-transitory computer-readable recording medium for storing a program that when executed on a computer causes image processing of performing processes of recording and playing image data at a plurality of frame rates, the program comprising the steps of:
when performing the process of recording the image data at each of the frame rates, embedding a numerical value representing a recording rate corresponding to the frame rate in an unused area included in an area of flags in an index entry that is paired with stream data to be recorded by setting a plurality of values in a plurality of bits of the unused area in the flag area, in accordance with a predetermined file format, storing the numerical value in a storage section, and updating recording rate management information, which includes a rate change flag indicating whether a change has been made in the recording rate corresponding to the frame rate at which the image data is recorded, a sensor input rate which is an input rate of an image sensor, a current recording rate, and the number of pieces of recorded image data,
wherein each bit of the plurality of bits of the unused area in the flag area is assigned to a respective recording rate corresponding to one of the plurality of frame rates, a particular bit corresponding to the current recording rate is set at a first value, and the other bits of the plurality of bits are set at a second value which is different from the first value, and
wherein the recording rate management information is stored in control memory for controlling the sensor input rate and rate change during the process of recording; and
when performing the process of playing the recorded image data, reading the numerical value representing the recording rate stored in the storage section to perform the playing process.

20. An image processing apparatus capable of performing processes of recording and playing image data at a plurality of frame rates, the apparatus comprising:
storage means; and
control means for, when performing the process of recording the image data at each of the frame rates, embedding a numerical value representing a recording rate corresponding to the frame rate in an unused area included in an area of flags in an index entry that is paired with stream data to be recorded by setting a plurality of values in a plurality of bits of the unused area in the flag area, in accordance with a predetermined file format, storing the numerical value in said storage means, and updating recording rate management information, which includes a rate change flag indicating whether a change has been made in the recording rate corresponding to the frame rate at which the image data is recorded, a sensor input rate which is an input rate of an image sensor, a current recording rate, and the number of pieces of recorded image data,
wherein each bit of the plurality of bits of the unused area in the flag area is assigned to a respective recording rate corresponding to one of the plurality of frame rates, a particular bit corresponding to the current recording rate is set at a first value, and the other bits of the plurality of bits are set at a second value which is different from the first value, and
wherein the recording rate management information is stored in control memory for controlling the sensor input rate and rate change during the process of recording.

* * * * *